…

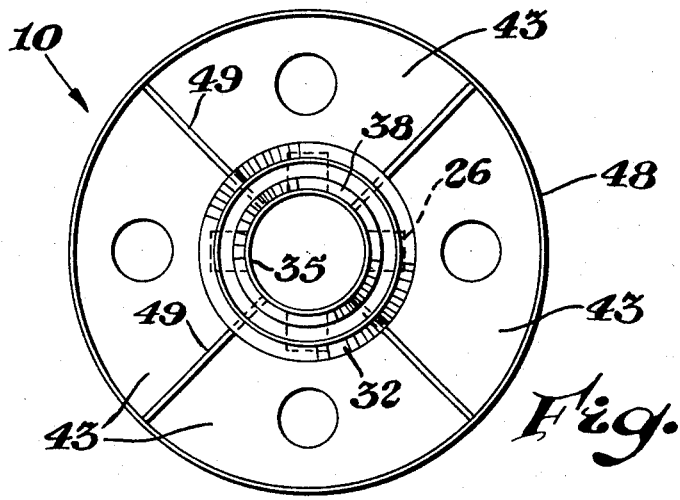
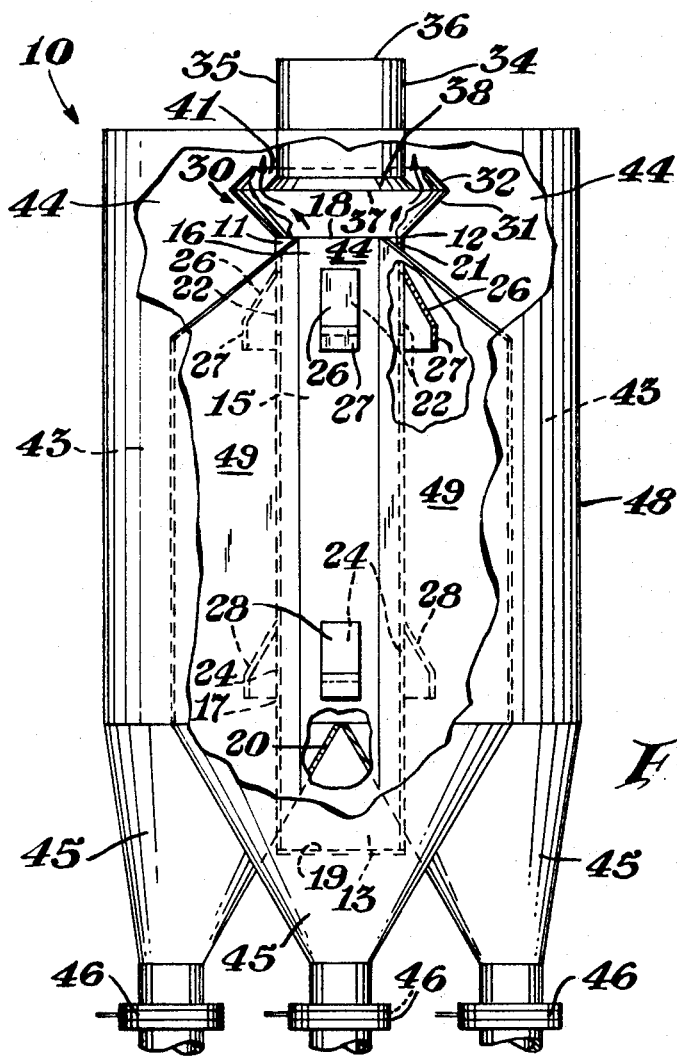

United States Patent Office 3,388,894
Patented June 18, 1968

3,388,894
BLENDING APPARATUS
James W. Harrison, Freeport, Tex., assignor to The Dow Chemical Company, Midland, Mich., a corporation of Delaware
Filed July 14, 1967, Ser. No. 653,490
7 Claims. (Cl. 259—4)

ABSTRACT OF THE DISCLOSURE

A multi-compartment hopper is provided, each of the compartments having a separate discharge, each compartment being supplied by a common supply header which divides incoming material more or less equally between the compartments. Back flow of granular material from one compartment to another is prevented.

---

This invention relates to a blending apparatus, and more particularly relates to a blending apparatus suitable for combining various batches of granular solids to provide a more uniform product.

Oftentimes, in large-scale commercial processes where granular solids are produced from one or more reactors or particle porducing devices, it is highly desirable to blend together the particulate material from the various sources in order to provide a product of generally uniform quality. In either batch operation or continuous operation, the variation from desired production starts will usually be random in nature, and thus, if the products are combined, a more uniform product will result. Thus, it is desirable that a stream of product perhaps made up of batches of product or a plurality of continuous streams be combined with each other to provide a product having generally the average characteristics of the components. One method of achieving such mixing is to employ a plurality of hoppers or bins and feed the product to such bins by means of a travelling feed supply which moves from one hopper to another until a portion of each batch is deposited in each bin. Such an apparatus is subject to mechanical breakdown and does not always provide a desired even distribution of the product to the various bins or hoppers.

It would be desirable if there were available an improved apparatus for combining various portions of granular material.

It would also be desirable if such an apparatus required no moving parts other than valves.

It would also be advantageous if such an apparatus were available which was relatively simple to construct.

These benefits and other advantages in accordance with the present invention are achieved in a blending apparatus, the blending apparatus comprising in cooperative combination a feed header having an inlet port, the inlet port adapted to be upwardly disposed and fed a granular material by gravity, a plurality of bins disposed adjacent to the feed header, the feed header being in operative communication with each of the bins by means fo at least one individual feed port to each bin, the feed port comprising a passage having flow control means, the flow control means so constructed and arranged so as to permit flow of a granular solid from the feed header into a bin when the level of granular solid in the bin is lower than the level of granular solid in the header and to prevent flow of granular solid from the bin to the header when the level of granular solid in the bin is above the level of the granular solid in the header, and each of the bins having a discharge means.

Further features and advantages of the present invention will become more apparent from the following specification taken in connection with the drawing wherein:

FIGURE 1 is a schematic partly-in-section representation of an apparatus in accordance with the present invention.

FIGURE 2 is a top view of the apparatus of FIGURE 1.

FIGURE 3 depicts an alternate arrangement of a flow control means for practice of the present invention.

In FIGURES 1 and 2 there is depicted an apparatus in accordance with the invention generally designated by the reference numeral 10. The apparatus 10 comprises in cooperative combination a feed header 11. The feed header 11 has a generally elongate hollow configuration and has a first or top end 12 and a second or bottom end 13. The header 11 defines an elongate internal cavity 15 having a first or top end 16 and a second or lower end 17. The first or top end 16 defines a feed opening 18. The second end 13 of the header 11 has disposed therein a closure 19. The closure 19 has a tapering plug or bottom a closure 20 tapering toward the first end 16. The feed header 11 has a peripheral wall 21 defining the cavity 15. The wall 21 defines a plurality of first or upper feed ports 22 providing full communcation between the cavity 15 and space external to the header 11. The wall 21 defines a plurality of second or lower feed ports 24 also providing communication between the cavity 15 and space external to the header 11. Each of the top feed ports 22 have a corresponding lower feed port 24. A dependent external flange or hood or flow control means 26 is secured to the header 11 at a location between the feed ports 22 and the first end 12 of the header 11. The flange 26 is dependent from the body 11 and terminates in a second end 27 disposed generally toward the second end 13 of the header 11. The flange or flow control means 26 effectively covers the corresponding feed port 22 in such a manner that a granular material readily flows outwardly from the cavity 15 through the feed port 22 and a granular material external to the header 11 is prevented (primarily by its angle of repose) from passing into the cavity 15. Corresponding and similarly arranged flanges 28 are disposed over the second or lower feed ports 23. The first end 12 of the header 11 is in full communication with a venting assembly generally designated by the reference numeral 30. The venting assembly comprises a first outwardly flaring section 31 affixed to the second end 12 of the feed header 11 and outwardly flaring in a direction away from the second end 13 of the header 11. An inwardly flaring flange or frustoconical section 32 is secured to the outwardly flaring section 21, the section 32 inwardly flaring in a direction remote from the second end 13 of the header 11. A source 34 of particulate material is positioned partially within the venting section. The source 34 comprises a hollow conduit 35 having an inlet end 36 and a discharge end 37. The discharge end 37 terminates in an outwardly flaring flange 38. The particulate material source 34 and the flange 32 define therebetween an annular venting space 41. A plurality of bins 43 are disposed about the feed header 11. Each of the bins 43 has an upper or first portion 44 and a lower or discharge portion 45. The lower or discharge portion 45 comprises hollow tapering sections terminating remote from the upper sections 44 in discharge means or slide valves 46. The major portion of the bins 43 are defined by a generally hollow cylindrical shell 48 containing a plurality of radially disposed dividers 49. The shell 48 is generally symmetrically disposed about the feed header 11. The cylindrical shell 48 has an upper or open end 51.

In operation of the apparatus of FIGURES 1 and 2, batches of particulate material are introduced to the feed header 11 through the particulate material source 34. From the source 34, the particulate material under influence of gravity, flows from the first end of the feed header 11 into the cavity 15 and is discharged symmetrically to the bins 43 through the openings 24. When the bins 43 are filled to a level such that the particulate material no longer passes therethrough, the header 11 fills to a level of the discharge ports 22 and is symmetrically discharged into the bins 43. Thus, generally equal portions of material from the source 34 are fed to each of the bins 43. As desired, the granular material is removed from the bins 43 by the discharge means such as the slide valves 46. The flow control means or flange 27 permits any one of the bins 43 to be emptied without particulate material passing from one bin to the other, assuming, of course, that the particular material being handled has a finite angle of repose. The presence of the annular venting space 41 defined by the flanges 37 and 32 is of benefit when particulate material is conveyed to the blending apparatus by a stream of gas. The annular venting space 41 allows the particulate material to pass into the header 11 and the gas to be discharged through the venting space 41. In accordance with air conveying procedures, the cross-sectional area of the annulus 41 should be sufficiently large to permit escape of gas without entrainment of the particulate material.

In FIGURE 3 there is depicted a fractional sectional view of an alternative header generally designated by the reference numeral 50. The header 50 comprises a hollow conduit wall 51 having an upper portion 52 and a lower portion 53. A passageway 55 is formed in the conduit wall 51 corresponding generally to the passageways or feed ports 22 and 24 of the apparatus of FIGURE 1. A flow control means 56 is disposed internally to the header 50. The flow control means 56 comprises an upwardly and inwardly flaring housing 57 defining a passageway 58 which is in full communication with the interior of the header 50. The housing 57 is secured to the header wall 51 at a location 59 adjacent the lower end 53 of the housing 57 and terminates at a location 61 generally adjacent the portion of the passageway 58 adjacent the upper end 52 of the header 50, thus effectively preventing granular material disposed external to the header 50 from flowing by means of gravity through the passageway 55 to the interior of the header 50 and readily permitting granular material to flow through the opening 58 and the feed port or passageway 55 to a location external to the header 50. Thus, when a level of granular material external to the header 50 is lower than the level within the header 50 (and above the terminal location 61), granular material is readily discharged.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A blending apparatus, the blending apparatus comprising in cooperative combination
    a feed header having
        an inlet port, the inlet port adapted to be upwardly disposed and receive a granular material fed by gravity,
    a plurality of bins disposed adjacent to the feed header, the feed header being in operative communication with each of the bins by means of at least one individual feed port for each bin, the feed port comprising
        a passageway and
        a flow control means, the flow control means so constructed and arranged so as to permit flow of a granular solid from the feed header into a bin when the level of granular solid in the bin is lower than the level of granular solid in the header and to prevent flow of granular solid from the bin to the header when the level of granular solid in the bin is above the level of granular solid in the header and each of the bins having
    a discharge control means.

2. The apparatus of claim 1 wherein the header is in communication with each of the bins by at least two feed ports longitudinally spaced from the feed header.

3. The apparatus of claim 1 wherein the plurality of bins are radially disposed about the feed header.

4. The apparatus of claim 3 wherein the plurality of bins are defined by a generally hollow cylindrical shell having a plurality of radially disposed dividers.

5. The apparatus of claim 1 wherein the flow control means comprises an externally disposed hood over the feed ports having a dependent flange terminating adjacent the discharge means.

6. The apparatus of claim 1 wherein the flow control means comprises a housing disposed within the feed header flaring inwardly toward the inlet port.

7. The apparatus of claim 1 including means defining a venting space disposed generally adjacent the inlet port and facing away from the discharge means.

References Cited

UNITED STATES PATENTS

| | | | |
|---|---|---|---|
| 1,145,215 | 7/1915 | Roney | 259—180 |
| 2,455,572 | 12/1948 | Evans | 259—180 |
| 2,907,501 | 10/1959 | Laird | 259—180 X |
| 3,145,975 | 8/1964 | Towns | 259—4 |
| 3,239,198 | 3/1966 | Albright | 259—4 |

ROBERT W. JENKINS, *Primary Examiner.*